US009823738B2

(12) United States Patent
Newell et al.

(10) Patent No.: US 9,823,738 B2
(45) Date of Patent: Nov. 21, 2017

(54) VIRTUAL ENTERTAINMENT ENVIRONMENT AND METHODS OF CREATING THE SAME

(71) Applicant: EchoStar Technologies L.L.C., Englewood, CO (US)

(72) Inventors: Nicholas B. Newell, Centennial, CO (US); Omar A. Khan, Englewood, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/449,013

(22) Filed: Jul. 31, 2014

(65) Prior Publication Data

US 2016/0037236 A1 Feb. 4, 2016

(51) Int. Cl.

| | |
|---|---|
| ***H04N 21/45*** | (2011.01) |
| ***H04N 21/41*** | (2011.01) |
| ***H04N 21/81*** | (2011.01) |
| ***G06F 3/01*** | (2006.01) |
| ***H04N 21/431*** | (2011.01) |
| ***H04N 21/442*** | (2011.01) |
| ***H04N 21/478*** | (2011.01) |
| ***H04N 21/482*** | (2011.01) |

(52) U.S. Cl.

CPC ......... *G06F 3/011* (2013.01); *H04N 21/4122* (2013.01); *H04N 21/4316* (2013.01); *H04N 21/44222* (2013.01); *H04N 21/4532* (2013.01); *H04N 21/47815* (2013.01); *H04N 21/482* (2013.01); *H04N 21/8133* (2013.01); *H04N 21/8153* (2013.01)

(58) Field of Classification Search

None

See application file for complete search history.

(56) References Cited

U.S. PATENT DOCUMENTS 7,426,467 B2 * 9/2008 Nashida .................... G06F 3/16 348/E7.061
7,516,469 B1 * 4/2009 Kikinis .............. H04N 5/44543 725/39
8,560,387 B2 * 10/2013 Amidon ................. G06Q 10/10 705/14.4
8,869,197 B2 * 10/2014 Chang ................ H04N 7/17318 725/37
8,984,568 B2 3/2015 Mickelsen et al.
2010/0083308 A1 * 4/2010 Chang ................ H04N 7/17318 725/37
2012/0069131 A1 * 3/2012 Abelow ............... G06Q 10/067 348/14.01

(Continued)

*Primary Examiner* — Nathan Flynn
*Assistant Examiner* — Christine Kurien
(74) *Attorney, Agent, or Firm* — Seed IP Law Group LLP

(57) ABSTRACT

Various embodiments facilitate the creation and presentation of a virtual entertainment world. In one embodiment, the virtual entertainment world is created to help a user find and watch content. The virtual entertainment world includes various environments, including a virtual program guide, a virtual viewing environment, and a concession environment. The virtual program guide provides a starting point for users to easily and efficiently find content. The virtual viewing environment provides an immersive environment for users to watch content. The concession environment provides a convenient location where users may make purchases.

20 Claims, 12 Drawing Sheets

(56) References Cited

U.S. PATENT DOCUMENTS

| | | | | |
|---|---|---|---|---|
| 2013/0260850 | A1* | 10/2013 | Carpe | A63F 13/79 463/9 |
| 2013/0346177 | A1* | 12/2013 | Jung | G06Q 30/0255 705/14.25 |
| 2014/0189733 | A1 | 7/2014 | Anguiano | |
| 2014/0189743 | A1 | 7/2014 | Kennedy et al. | |

* cited by examiner

VIRTUAL ENTERTAINMENT ENVIRONMENT AND METHODS OF CREATING THE SAME

TECHNICAL FIELD

This disclosure relates to a virtual entertainment environment and methods of creating the same.

BACKGROUND

Most users use programming guides to find content to watch on their television ("TV"). A typical programming guide includes a grid of text that provides information on available content. For example, the programming guide may state what channels are available, what content is available on the channels, and the dates and times of when the content will be showing. As such, programming guides forces users to read through a plethora of text to find content to watch. This results in a user experience that is neither interactive nor engaging.

In addition, some users don't have a specific TV show or movie in mind when they watch TV. These users aimlessly search through multiple screens of their programming guide and decide what to watch based on short text descriptions of the content. This approach is inefficient and impersonal.

BRIEF SUMMARY

According to one embodiment, a virtual entertainment world is created to help a user find and watch content. The virtual entertainment world includes various interactive environments, including a virtual program guide, a virtual viewing environment, and a concession environment.

The virtual program guide provides a starting point for the user to easily and efficiently find content. Within the virtual program guide, a concierge model may be at a customizable location and interact with the user. For example, the concierge model may be in Times Square in New York City and may recommend content to the user, answer any questions the user may have, and invite a celebrity model in to the virtual program guide to provide more information.

The virtual viewing environment provides an immersive environment for the user to watch content. The virtual viewing environment may display a location that is related to content currently being watched or that has been selected by the user. The virtual viewing environment may also include a celebrity model that interacts with the user. For example, the virtual viewing environment may include a theatre location and a celebrity model of Sandra Bullock. The celebrity model of Sandra Bullock may watch content with the user and provide additional description information about content currently being watched.

The concession environment provides a convenient location where the user may make purchases of real items, not virtual items. For example, users may buy food, apparel, and memorabilia, all within the virtual entertainment world.

The virtual entertainment world results in a more personal, convenient, immersive, and emotional user experience for both selecting a video event, and for the watching and participating in this video event.

DETAILED DESCRIPTION

A. Overview

Figure 1:
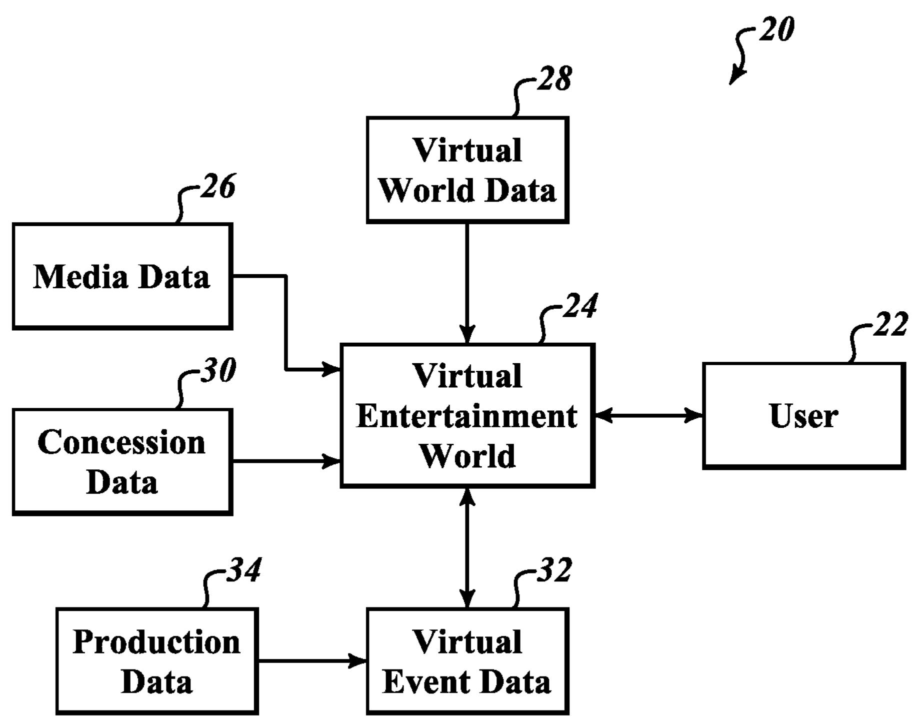
FIG. 1 is an overview block diagram illustrating an example of data flow for a virtual entertainment environment according to one embodiment as disclosed herein.

FIG. 1 is an overview block diagram illustrating an example of data flow for a virtual entertainment environment 20 according to principles disclosed herein. In this example, the virtual entertainment environment 20 includes a user 22, a virtual entertainment world 24, media data 26, virtual world data 28, concession data 30, virtual event data 32, and production data 34.

The user 22 is presented the virtual entertainment world 24 that the user 22 may participate and interact within. As will be discussed in detail with respect to FIGS. 2 and 8, the user 22 may view the virtual entertainment world 24 by using a virtual headset 52.

The virtual entertainment world 24 is created using various data sources. Specifically, the virtual entertainment world 24 uses the media data 26, the virtual world data 28, the concession data 30, and the virtual event data 32. The media data 26, the virtual world data 28, and the concession data 30 will be discussed in detail with respect to FIGS. 4-6, respectively. The virtual event data 32 is a consolidation of the production data 34 from one or more distributors. Distributors may include broadcast networks or other content providers. The production data 34 will be discussed in detail with respect to FIG. 7.

The virtual entertainment world 24 includes various virtual environments, such as a virtual program guide, a virtual viewing environment, and a concession environment. As will be discussed in detail with respect to FIG. 11, a virtual program guide acts as a launching point for the user 22 to make selections. As will be discussed in detail with respect to FIGS. 12A and 12B, a virtual viewing environment provides a viewing location to watch selected virtual events and a concession environment provides an environment to make purchases of real items.

B. Example Virtual Entertainment Environment System

Figure 2:
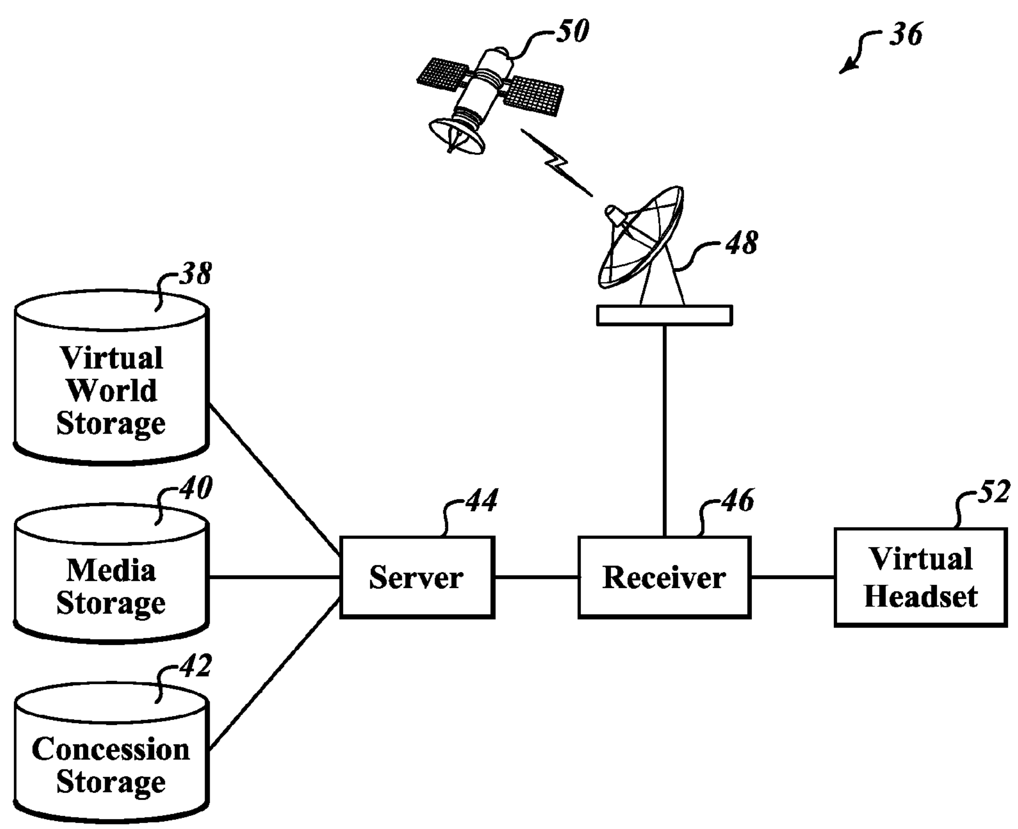
FIG. 2 is a block diagram illustrating an example of a virtual entertainment environment system for carrying out a virtual entertainment environment according to one embodiment as disclosed herein.

FIG. 2 is a block diagram illustrating an example of a virtual entertainment environment system 36 for practicing example embodiments of the virtual entertainment environment 20 according to principles disclosed herein. In this example, the virtual entertainment environment system 36 includes a virtual world storage 38, a media storage 40, a concession storage 42, a server 44, a receiver 46, a receiver antenna 48, a satellite 50, and the virtual headset 52

The virtual world storage 38, the media storage 40, and the concession storage 42 are coupled to the server 44. The virtual world data 28, the media data 26, and the concession data 30 are recorded in the virtual world storage 38, the media storage 40, and the concession storage 42, respectively.

The server 44 is configured to access the virtual world storage 38, the media storage 40, and the concession storage 42 and to assemble the media data 26, the virtual world data 28, and the concession data 30. The server 44 may access the virtual world storage 38, the media storage 40, and the concession storage 42 periodically, upon notification of data being updated, or on-demand. For convenience, media data 26, the virtual world data 28, and concession data 30 are collectively referred to as virtual environment data.

The receiver 46 is coupled to the server 44 and a receiver antenna 48. The receiver 46 is configured to obtain the virtual environment data from the server 44 and obtain the virtual event data 32 from the receiver antenna 48. The virtual event data 32 is transmitted from one or more distributors to the receiver antenna 48 through a satellite 50. Upon obtaining the virtual environment data and the virtual event data 32, the receiver 46 is configured to combine the virtual environment data and the virtual event data 32 to create the virtual entertainment world 24. The receiver 46 may obtain the virtual environment data and the virtual event data 32 periodically, upon notification of data being updated, or on-demand. In another embodiment, the server 44 assembles both the virtual environment data and the virtual event data 32, and the receiver 46 obtains the virtual event data 32 from the server 44, instead of the receiver antenna 48.

The virtual headset 52 is coupled to the receiver 46. The virtual headset 52 is configured to provide virtual transport of the user 22 into the virtual entertainment world 24 by displaying the virtual entertainment world 24 to the user 22. Through the virtual headset 52, the user 22 is able to participate and interact with the virtual entertainment world 24.

Figure 3:
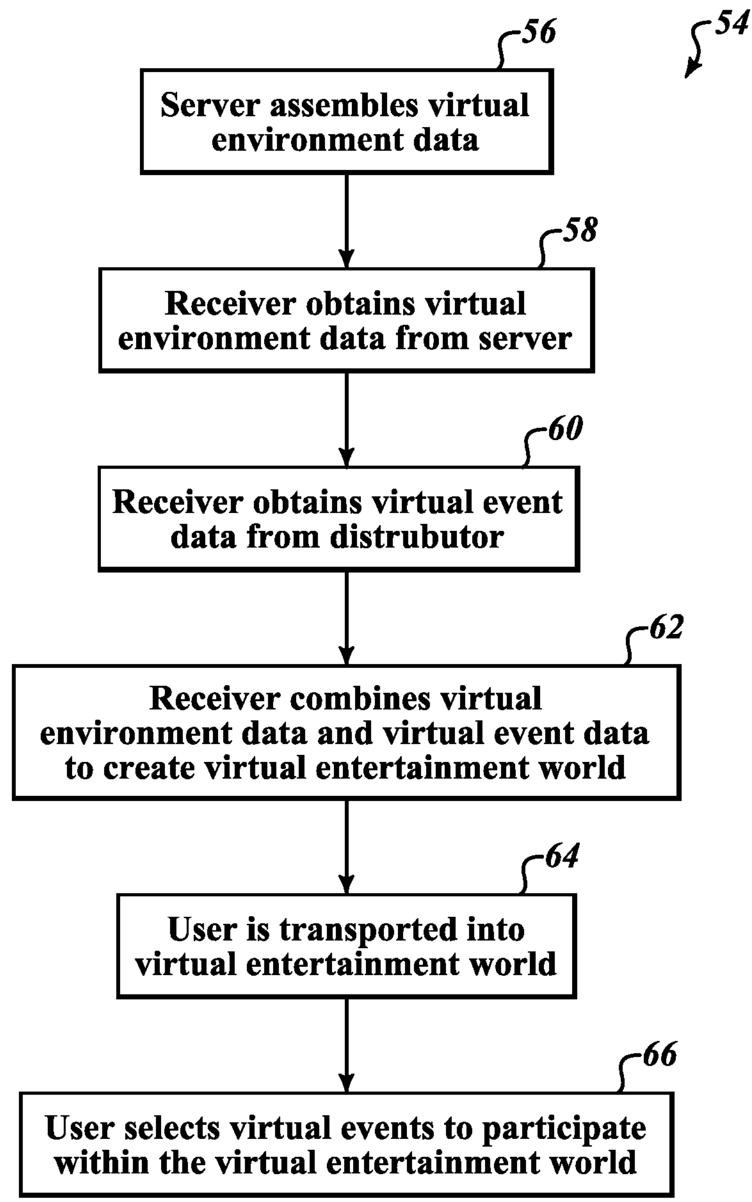
FIG. 3 is a flow diagram illustrating an example of a virtual entertainment world creation process for a virtual entertainment environment according to one embodiment as disclosed herein.

FIG. 3 is a flow diagram illustrating an example of a virtual entertainment world creation process 54 for the virtual entertainment environment 20 according to principles disclosed herein.

At a first part of the sequence 56, the server 44 accesses the virtual world storage 38, the media storage 40, and the concession storage 42 to obtain and assemble the virtual environment data. The server 44 may assemble the virtual environment data by gathering and packaging the media data 26, the virtual world data 28, and the concession data 30 at a single location.

In a subsequent step 58, the receiver 46 obtains the virtual environment data from the server 44. For example, the receiver 46 may obtain the virtual environment data by the server 44 pushing the data to the receiver 46, or by the receiver 46 pulling the data from the server 44.

In step 60, the receiver 46 obtains the virtual event data 32 from the one or more distributors through the receiver antenna 48 and the satellite 50. Similar to step 58, the receiver 46 may obtain the virtual event data 32 from the one or more distributors by a push or pull method. It should be noted that, although step 60 is shown to be subsequent to step 58, step 60 may be performed prior to step 58 or concurrently with step 58.

In step 62, the receiver 46 combines the virtual environment data and the virtual event data 32 to create the virtual entertainment world 24. For example, the virtual environment data and the virtual event data 32 is used to create a virtual programming guide, including a concierge model, a concierge location, virtual events, and a celebrity model.

In step 64, the user 22 is transported into the virtual entertainment world 24 through the virtual headset 52. For example, the virtual headset 52 may display the virtual entertainment world 24 to the user 22.

In step 66, the user 22 may select virtual events to participate within the virtual entertainment world 24. Virtual events may include advertisements, TV shows, movies, documentaries, music videos, interviews, commentaries, biographies, question and answer sessions, and introductions by celebrities. A user selection process 92 will be discussed in detail with respect to FIG. 9.

It should be noted that the server 44 may comprise one or more distinct computing systems/devices and may span distributed locations. Furthermore, each block shown may represent one or more such blocks as appropriate to a specific embodiment or may be combined with other blocks.

In addition, the receiver 46 may be any suitable converter device or electronic equipment that is operable to receive data. The receiver 46 may be interchangeably referred to as a “TV converter,” “receiving device” “set-top box,” “TV receiving device,” “TV receiver,” “TV recording device,” “satellite set-top box,” “satellite receiver,” “cable set-top box,” “cable receiver,” “media player,” and/or “TV tuner.”

In another embodiment, the virtual headset 52 may be replaced by other presentation devices. Examples include a TV, a personal computer (“PC”), a sound system receiver, a digital video recorder (“DVR”), a compact disk (“CD”) device, game system, or the like. Presentation devices employ a display, one or more speakers, a microphone, and/or other input/output devices to communicate with the user 22. In many implementations, one or more presentation devices reside in or near the user’s 22 premises and are communicatively coupled to the receiver 46. Further, the receiver 46 and a presentation device may be integrated into a single device. Such a single device may have the above-described functionality of the receiver 46 and the virtual headset 52, or may even have additional functionality.

In another embodiment, the receiver antenna 48 and the satellite 50 may be replaced by many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

C. Example Virtual Entertainment Environment Data

The media data 26 is used to create a virtual program guide and a virtual viewing environment. In this example, the media data 26 includes media (e.g., text, photos, videos) related to celebrities and celebrity model data used to create celebrity models. The celebrity models are configured to interact with the user 22 within the virtual entertainment world 24. Celebrities may include any known person that is related to a particular virtual event. Examples include actors, actresses, directors, critics, writers, singers, and songwriters.

The media data 26 may be updated over time to include media and celebrity model data for an assortment of celebrities. For example, the celebrity model data may be updated periodically to create celebrity models of actors and actresses starring in new movie releases.

Figure 4:
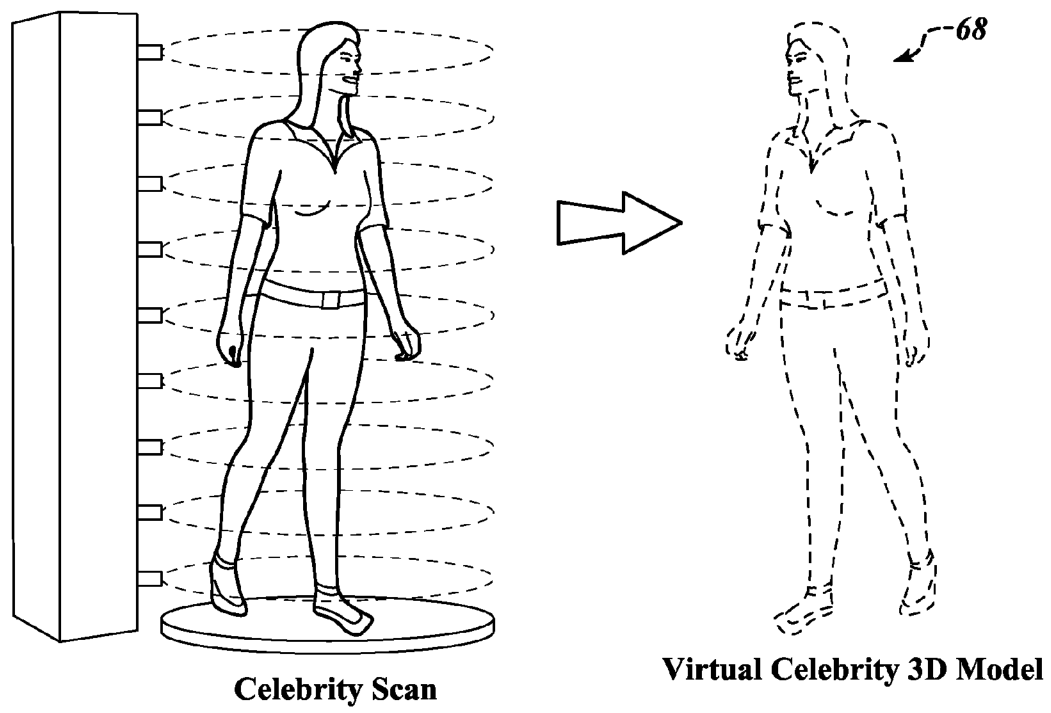
FIG. 4 is a view illustrating an example of a virtual celebrity 3D model according to one embodiment as disclosed herein.

As shown in FIG. 4, in one embodiment, the celebrity model data may be used to create virtual celebrity three-dimensional (3D) models 68. The celebrity model data may be captured by using a camera and depth sensor that use full-body 3D motion capture technologies to output a depth and color stream.

Figure 5:
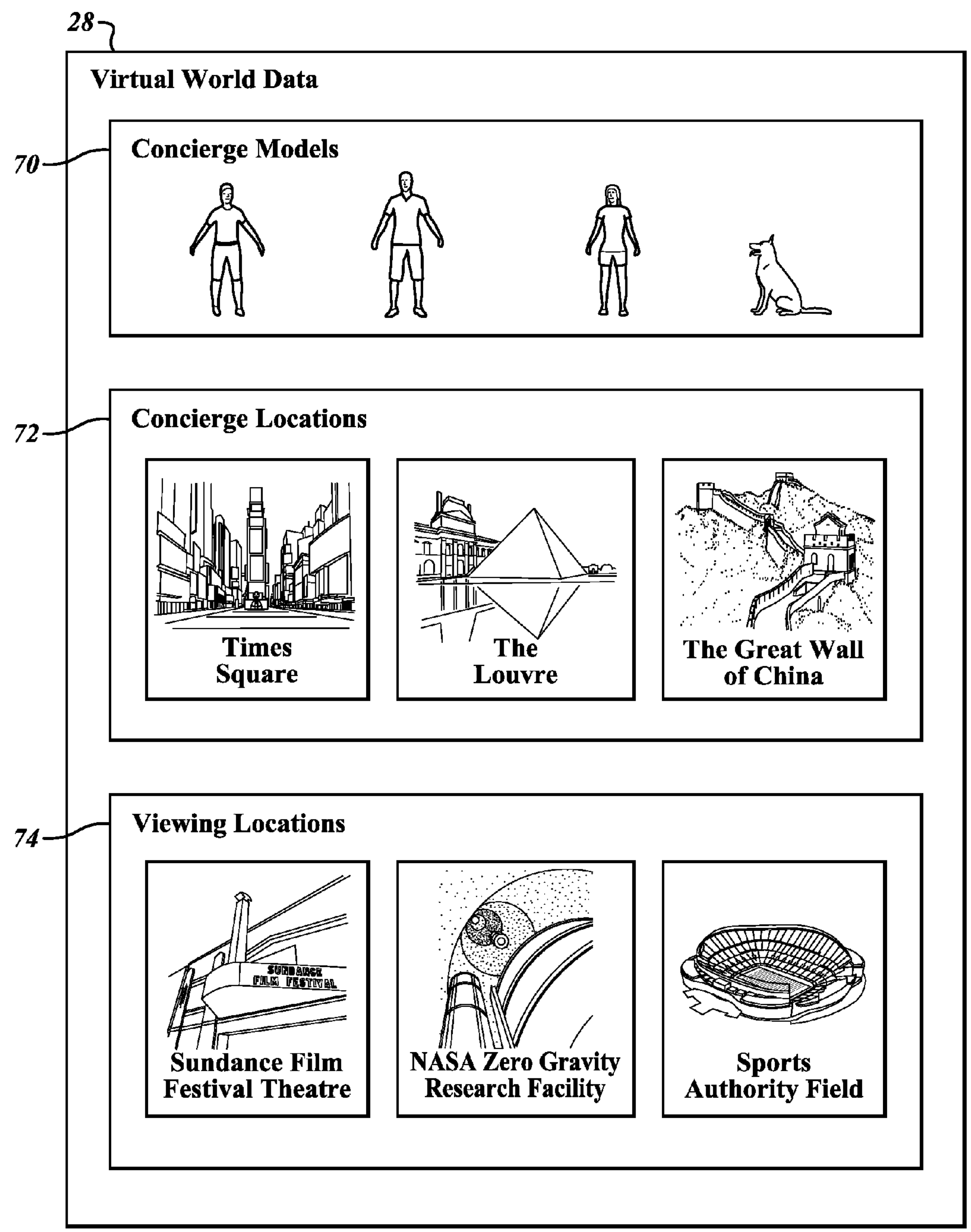
FIG. 5 is a block diagram illustrating an example of virtual world data for a virtual entertainment environment according to one embodiment as disclosed herein.

FIG. 5 is a block diagram illustrating an example of the virtual world data 28 for the virtual entertainment environment 20 according to principles disclosed herein. The virtual world data is used to create a virtual program guide, a virtual viewing environment, and a concession environment within the virtual entertainment world 24. In this example, the virtual world data 28 includes concierge model data 70, concierge location data 72, and viewing location data 74.

The concierge model data 70 is used to create concierge models 114, within the virtual entertainment world 24. A concierge model plays an interactive role with the user 22 and helps the user 22 to find virtual events within the virtual entertainment world 24. Concierge models may include a number of options from which the user 22 may choose from. For example, concierge models 114, may include people with separate appearances, attitude, and accents; animals; or any type of character that may be appealing to the user 22.

In one embodiment, the concierge model 114 is pre-selected for the user 22. For example, the concierge model 114 may be selected randomly, may default to a particular concierge model, or may be selected to match a selected concierge location.

The concierge location data 72 is used to create concierge locations within the virtual entertainment world 24. A concierge location provides a scene where the user 22 can interact with a concierge model. Concierge locations may include a number of options from which the user 22 may choose from. For example, as shown in FIG. 5, concierge locations may include Times Square in New York City, the Louvre in Paris, and the Great Wall of China. In one embodiment, the concierge locations include places where objects are known to be put on display. For example, Times Square in New York City may be included because it is known for displaying advertisements on billboards, and the Louvre in Paris may be included because it is known for its art gallery.

In one embodiment, the concierge location 116 is pre-selected for the user 22. For example, the concierge location 116 may be selected randomly, may default to a particular concierge location, or may be selected to match a selected concierge model.

The viewing location data 74 is used to create viewing locations within the virtual entertainment world 24. A viewing location provides a scene for the user 22 to watch a selected virtual event. Viewing locations may include a number of options from which the user 22 may choose from. For example, as shown in FIG. 5, viewing locations may include the Sundance Film Festival Theatre, NASA Zero Gravity Research Facility, and Sports Authority Field.

In one embodiment, the viewing location is pre-selected for the user 22 based on a selected virtual event. For example, if the user 22 selects the Oscar-winning movie Gravity, the viewing location may be pre-selected to be the NASA Zero Gravity Research Facility, or if the user 22 selects a John "The Duke" Wayne movie, the viewing location may be pre-selected to be in a desert.

Similar to the celebrity model data 68, the concierge model data 70, concierge location data 72, and the viewing location data 74 may be captured using 3D motion capture technologies to create 3D concierge models, concierge locations, and viewing locations respectively.

It should be noted that, although only a few examples of concierge models 70, concierge locations 72, and viewing locations 74 are shown in FIG. 5, the virtual world data 28 may be updated over time to include an assortment of different options for the user 22 to choose from. For example, the viewing locations 74 may be updated concurrently with new movie releases to include viewing locations related to the new movie releases.

Figure 6:
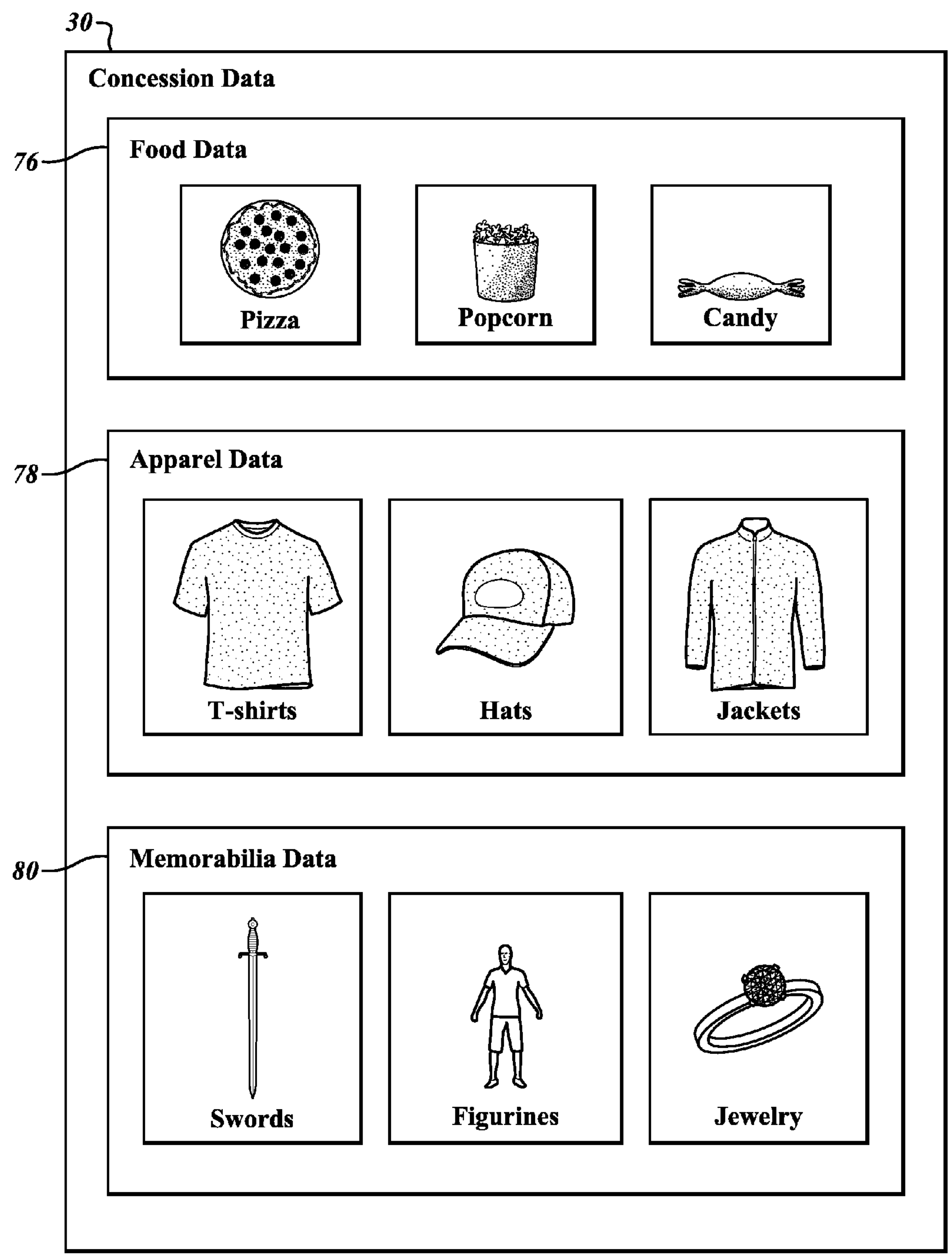
FIG. 6 is a block diagram illustrating an example of concession data for a virtual entertainment environment according to one embodiment as disclosed herein.

FIG. 6 is a block diagram illustrating an example of the concession data 30 for the virtual entertainment environment 20 according to principles disclosed herein. The concession data 30 is used to create a concession environment within the virtual entertainment world 24. In this example, the concession data 30 includes food data 76, apparel data 78, and memorabilia data 80.

The food data 76 includes information related to food services, such as the types of food that are available, the price of food items, and ordering information. Types of food may include pizza, popcorn, and candy.

The apparel data 78 includes information related to apparel that are available for purchase, such as the types of apparel that are available for purchase, the price of the apparel, and ordering information. Apparel may include shirts, hats, and jackets.

The memorabilia data 80 includes information related to memorabilia that are available for purchase, such as the types of memorabilia that are available for purchase, the price of the memorabilia, and ordering information. Memorabilia may include swords, figurines, and jewelry which are relevant to the video event that is selected.

It should be noted that, although only a few examples of food data 76, apparel data 78, and memorabilia data 80 are shown in FIG. 6, the concession data 30 may be updated over time to include an assortment of different options for the user 22 to choose from. For example, the apparel data 78 may be updated concurrently with new movie releases to include apparel related to the new movie releases.

Figure 7:
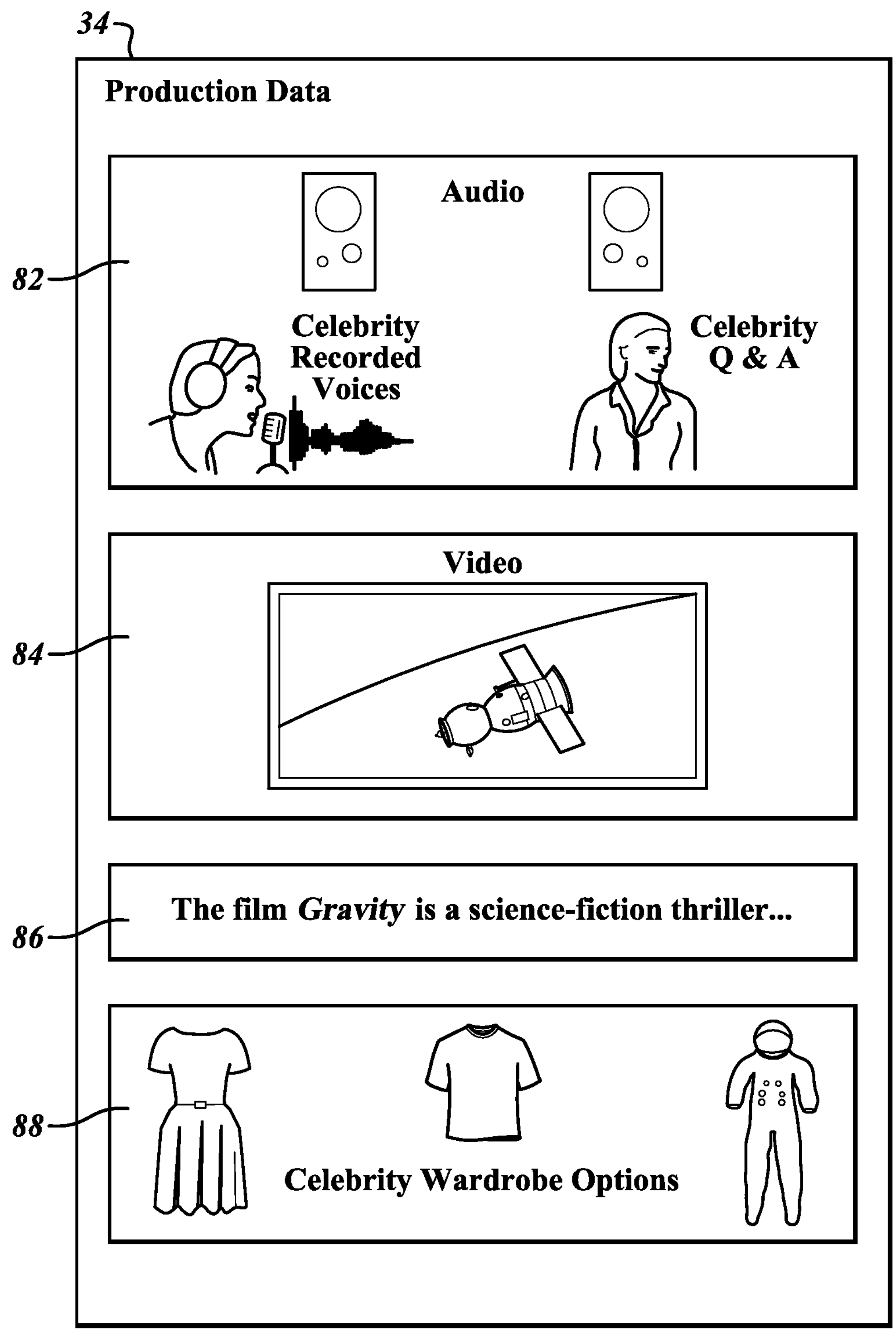
FIG. 7 is a block diagram illustrating an example of production data for a virtual entertainment environment according to one embodiment as disclosed herein.

FIG. 7 is a block diagram illustrating an example of the production data 34 for the virtual entertainment environment 20 according to principles disclosed herein. As discussed with respect to FIG. 1, the virtual event data 32 is a consolidation of production data 34 from one or more distributors. The virtual event data 32 is used to create a virtual program guide and virtual viewing environment within the virtual entertainment world 24. In this example, the production data 34 includes audio data 82, video data 84, description data 86, and celebrity wardrobe data 88.

The audio data 82 includes audio for virtual events. For example, the audio data 82 may provide sound for a TV show, commentary for a movie, background music for the virtual entertainment world 24, and celebrity voices.

In one embodiment, the celebrity voices are created by having actual celebrities pre-record their voices. Celebrities may pre-record introductions to movies that they were in, additional commentary for movies that they were in, various questions to ask the user 22, and various answers to potential questions asked by the user 22. For example, Sandra Bullock may pre-record an introduction that describes the Oscar-winning movie Gravity.

The video data 84 includes video for virtual events. For example, the video data 84 may provide the video for TV shows, movies, and documentaries.

The description data 86 includes textual information for virtual events. For example, the description data 86 may provide synopses for virtual events, background information for virtual events, and biographies of celebrities.

The celebrity wardrobe data 88 includes color and depth information to create celebrity wardrobe options for celebrity models. In one embodiment, the wardrobes may be used to dress celebrity models in clothes related to particular virtual events. For example, the celebrity wardrobe data 88 may be used to dress a celebrity model of Sandra Bullock in a space suit that she wore in the Oscar-winning movie Gravity.

It should be noted that, although only a few examples of audio data 82, video data 84, description data 86, and celebrity wardrobe data 88 are shown in FIG. 7, the production data 34 may be updated over time to include new data from one or more distributors. For example, the celebrity wardrobe data 88 may be updated concurrently with new movie releases to include clothes worn in the new movie releases.

D. Example User Processes for a Virtual Entertainment Environment System

Figure 8:
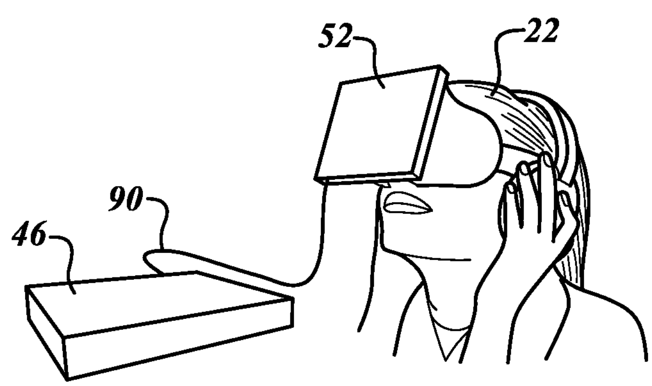
FIG. 8 is a schematic illustrating an example of a user connected to a virtual entertainment environment system according to one embodiment as disclosed herein.

FIG. 8 is a schematic illustrating an example of the user 22 connected to the virtual entertainment environment system 36 according to principles disclosed herein.

In this example, the user 22 is wearing the virtual headset 52 that is connected to the receiver 46 through a wire connection 90. The virtual headset 52 is configured to display the virtual entertainment world 24 to the user 22, and allow the user 22 to participate and interact within the virtual entertainment world 24. It should be noted that, although FIG. 8 shows that the virtual headset 52 is hardwired to the receiver 46, the virtual headset 52 may be coupled to the receiver 46 wirelessly.

Figure 9:
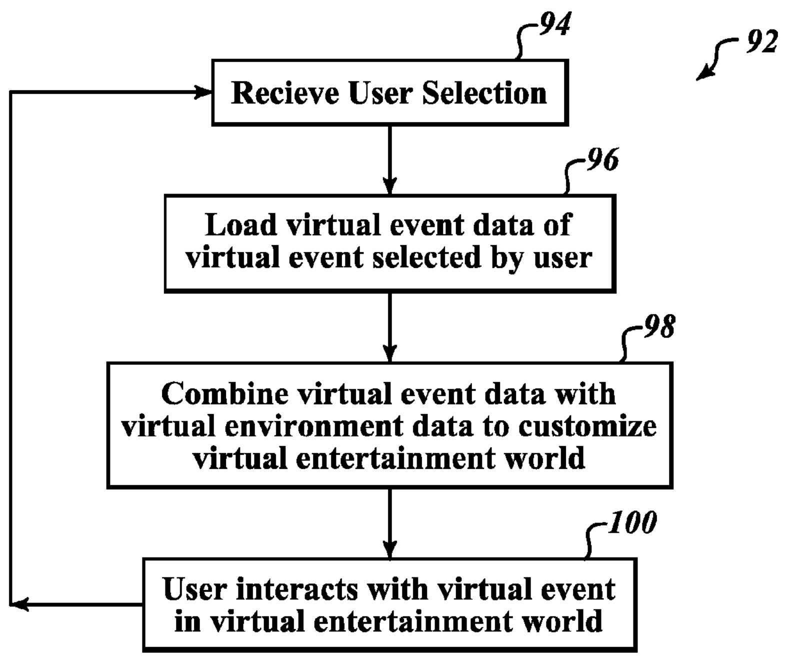
FIG. 9 is a flow diagram illustrating an example of a user selection process for a virtual entertainment environment according to one embodiment as disclosed herein.

FIG. 9 is a flow diagram illustrating an example of a user selection process 92 for the virtual entertainment environment 20 according to principles disclosed herein.

At a first part of the sequence 94, the receiver 46 receives a selection from the user 22 for a particular virtual event. For example, the user 22 may select to watch a movie in a virtual program guide.

In a subsequent step 96, the virtual event data of the selected virtual event is loaded by the receiver 46. For instance, the receiver 46 may retrieve the virtual event data from one or more distributors. In another embodiment, the virtual event data may have been obtained from the one or more distributors prior to the selection.

In step 98, the loaded virtual event data is combined with the virtual environment data to customize the virtual entertainment world 24. For example, in response to the user 22 selecting a movie in a virtual program guide, the loaded virtual event data and the virtual environment data are used to create a virtual viewing environment to watch the selected movie.

Once the virtual entertainment world 24 has been customized, the user 22 may then interact with the selected virtual event within the virtual entertainment world 24 in step 100. For instance, the user 22 may make additional selections or ask a celebrity model for additional information.

The sequence will return to step 94 when the receiver 46 receives a new selection from the user 22. The user selection process 92 will then repeat.

In an illustrating example of the user selection process 92, in step 94, the user 22 states a voice command to a concierge model in a virtual programming guide to play the Oscar-winning movie Gravity. Then, in step 96, virtual event data related to Gravity is retrieved from a distributor and is loaded in to the receiver 46. The loaded virtual event data is then combined with virtual environment data related to Gravity to create and customize a virtual viewing environment in step 98. The virtual viewing environment is customized by including a theatre location and a celebrity model of Sandra Bullock dressed as an astronaut. The user 22 then interacts with the virtual viewing environment by watching Gravity or by asking Sandra Bullock questions about her role in Gravity in step 100.

Figure 10:
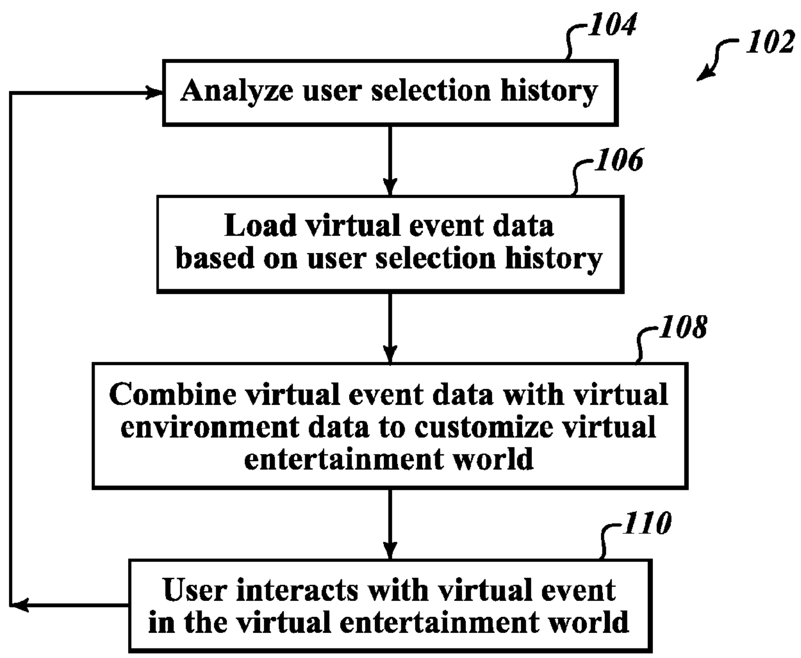
FIG. 10 is a flow diagram illustrating an example of a user recommendation process for a virtual entertainment environment according to one embodiment as disclosed herein.

FIG. 10 is a flow diagram illustrating an example of a user recommendation process 102 for the virtual entertainment environment 20 according to principles disclosed herein. The user recommendation process 102 recommends virtual events that the user 22 most likely wishes to select.

At a first part of the sequence 104, the receiver 46 analyzes the user's 22 selection history to determine virtual events to recommend to the user 22. For example, the receiver 46 may generate recommendations by tracking and analyzing the genre of TV shows that the user 22 likes to watch, what celebrities are in the TV shows, and the time of day the TV shows air to determine the user's 22 viewing habits. The recommendations may also be generated by the systems and methods described in one or more of U.S. patent application Ser. No. 13/732321 filed Dec. 31, 2012 and entitled "Automatic Learning Channel Customized to a Particular Viewer and Method of Creating Same"; U.S. patent application Ser. No. 13/732296 filed Dec. 31, 2012 and entitled "Method and Apparatus for Gathering and Using Geocoded Information from Mobil Devices"; and U.S. Pat. No. 8,984,568 filed Mar. 13, 2013 and entitled "Enhanced Experience from Standard Program Content."

In a subsequent step 106, the virtual event data 32 of virtual events are loaded based on the analysis in step 104. For instance, the receiver 46 may retrieve the virtual event data 32 from the one or more distributors.

In step 108, the loaded virtual event data 32 is combined with virtual environment data to customize the virtual entertainment world 24. For example, a virtual program guide may be customized to display the recommendations.

Once the virtual entertainment world 24 has been customized, the user 22 may then interact with the recommended virtual events in the virtual entertainment world 24 in step 110. For instance, the user 22 may choose to select one of the recommendations or make another selection.

The sequence will return to step 104 after a period of time, such as one day or more, as the user's 22 selection history updates. The user recommendation process 102 will then repeat.

In an illustrating example of the user recommendation process 102, in step 104, the receiver 46 may learn that the user 22 frequently watches Sandra Bullock movies and then determine that the user 22 may wish to watch a biography on Sandra Bullock. In step 106, virtual event data for the Sandra Bullock biography is loaded. The loaded virtual event data is then combined with virtual environment data to display the Sandra Bullock biography on a billboard in Times Square in New York City in step 108. The user 22 may then choose to select the Sandra Bullock biography or make another selection in step 110.

E. Example Virtual Entertainment World

Figure 11:
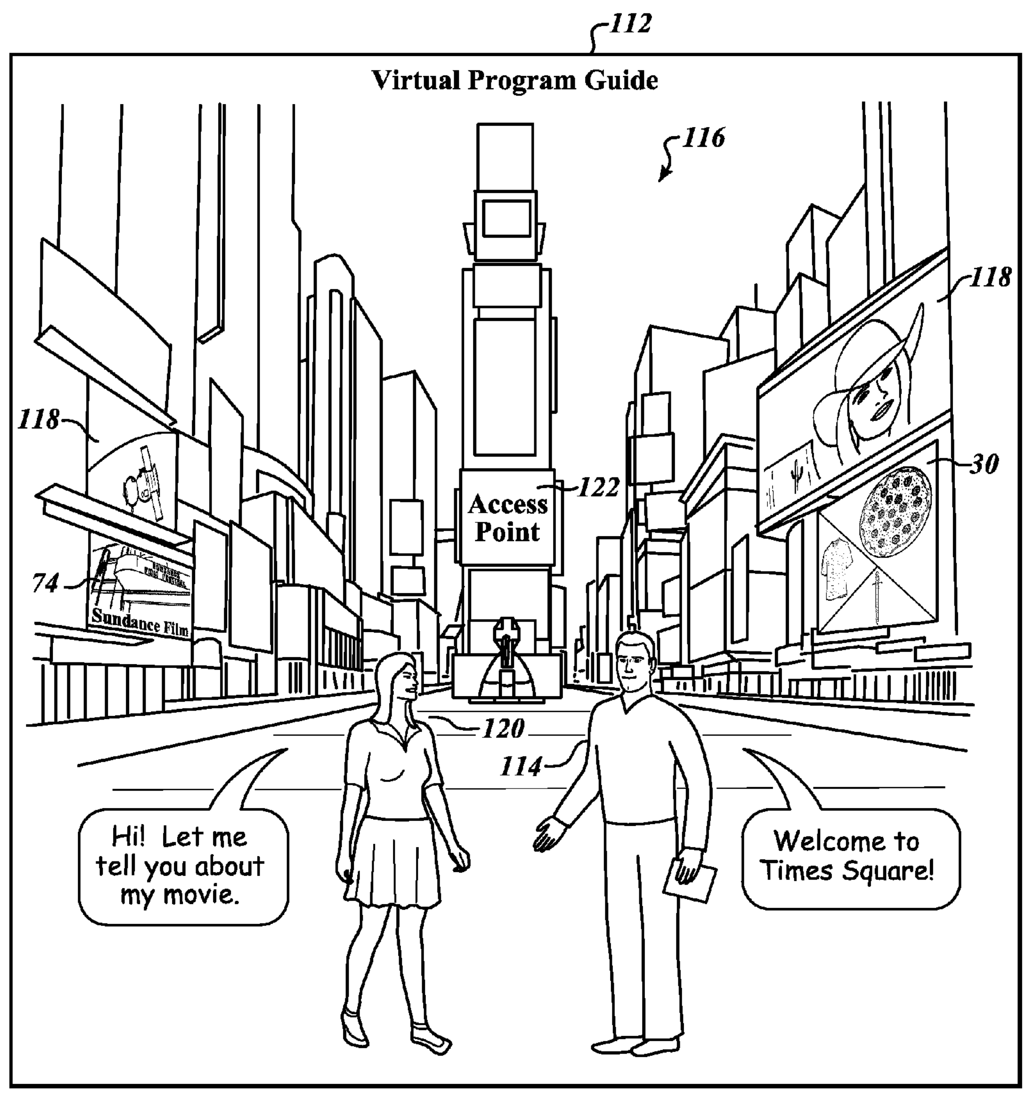
FIG. 11 is a view illustrating an example of a virtual program guide within a virtual entertainment world according to one embodiment as disclosed herein.

FIG. 11 is a view illustrating an example of a virtual program guide 112 within the virtual entertainment world 24 according to principles disclosed herein. The virtual program guide 112 may act as a launching point for the user 22 to make selections. In this example, the virtual program guide 112 includes concession data 30, selectable viewing locations 74, a concierge model 114, a concierge location 116, virtual events 118, a celebrity model 120, and an access point 122.

Concession data 30 is displayed to the user 22 to inform the user 22 of items available for purchase. For example, the concession data 30 may advertise a pizza, a shirt, and a sword that the user 22 may purchase. In one embodiment, if the user selects the concession data 30, a concession environment is displayed to the user 22.

Viewing locations 74 are displayed to the user 22 to allow the user 22 to select a viewing location for a future virtual viewing environment. For example, the user may set a viewing location for future selected virtual events to the Sundance Film Festival Theatre. In one embodiment, concierge models 70 are displayed to the user 22 to select a concierge model for the virtual program guide 112. For example, the user 22 may change the concierge model 114 to a dog. In another embodiment, concierge locations 72 are displayed to the user 22 to allow the user 22 to select a concierge location for the virtual program guide 112. For example, the user may change the concierge location 116 to the Louvre.

The concierge model 114 plays an interactive role with the user 22 and helps the user 22 to find virtual events. The concierge model 114 may ask questions to understand current preferences of the user 22, recommend virtual events to the user 22, process commands for the user 22, help the user 22 find specific virtual events, answer any questions the user 22 may have, and invite celebrity models in to the virtual program guide 112. As discussed with respect to FIG. 5, the concierge model 114 may be user selectable or pre-selected.

The concierge location 116 provides a scene where the user 22 can select the concierge locations 72, select the viewing locations 74, interact with the concierge model 114, select the virtual events 118, interact with the celebrity model 120, and select the access point 122. As discussed with respect to FIG. 5, the concierge location 116 may be user selectable or pre-selected.

The virtual events 118 are displayed to the user 22 to provide the user 22 with a selection of virtual events. As discussed with respect to FIG. 3, virtual events may include advertisements, TV shows, movies, documentaries, music videos, interviews, commentaries, biographies, question and answer sessions, and introductions by celebrities.

The celebrity model 120 is related to a particular virtual event and interacts with the user 22. The concierge model 114 may invite the celebrity model 120 to the concierge location 116 when the user 22 is considering a particular virtual event. The celebrity model may provide description information about the particular virtual event, or answer any questions the user 22 may have about the particular virtual event. For example, the user 22 may make a consideration selection of one of the virtual events 118, and the concierge model 114 may then invite the celebrity model 120 to introduce the consideration selection to the user 22.

The access point 122 allows the user 22 to access different environments within the virtual entertainment world 24. For example, the user 22 may choose to go directly to a virtual viewing environment that the user 22 has created in the past, or the user 22 may choose to go directly to a concession environment to make purchases.

In this particular example, as shown in FIG. 11, the virtual program guide 112 displays the concierge model 114 in the middle of Times Square in New York City. The concierge location 116 includes billboards that display concession data 30, user selectable viewing locations 74, a menu of the virtual events 118, and an access point 122 to a viewing environment or a concession environment. The menu of virtual events 118 includes the Oscar-winning movie Gravity and the movie True Grit. The concierge model 114 interacts with the user 22 by verbally introducing the virtual program guide 112. The concierge model 114 then receives a consideration selection of the movie Gravity from the user 22 and invites the celebrity model 120 of Sandra Bullock to the concierge location 116. Sandra Bullock is wearing wardrobe that she wore in Gravity and that is available for purchase in a concession environment. Sandra Bullock then verbally introduces Gravity to the user 22 and encourages the user 22 to watch it. The user 22 may then either select to watch Gravity, select another virtual event from the menu of virtual events 118, or make another consideration selection. As will be discussed in detail with respect to FIGS. 12A and 12B, if the user 22 selects to watch the movie, the user 22 is transported to a virtual viewing environment of their choice with the celebrity model 120.

Figure 12A:
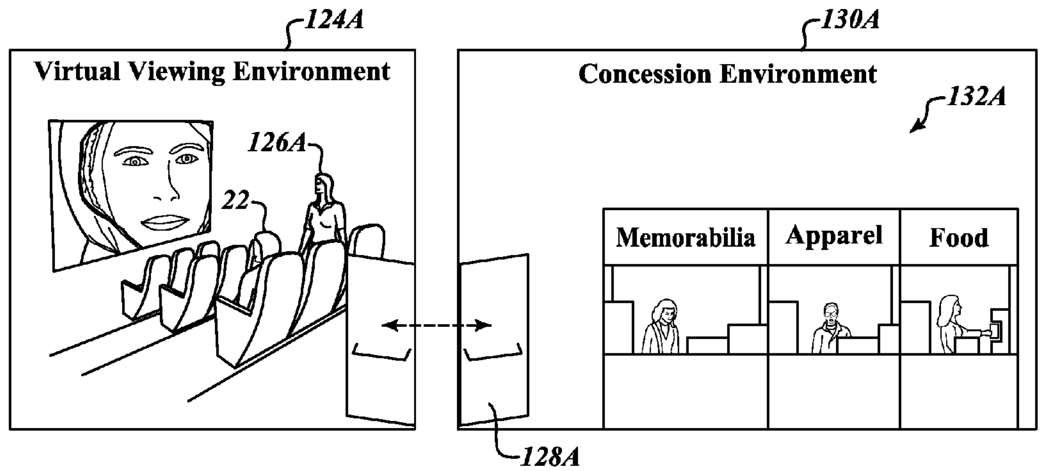
FIGS. 12A and 12B are views illustrating examples of virtual viewing environments and concession environments within a virtual entertainment world according to one embodiment as disclosed herein.
Figure 12B:
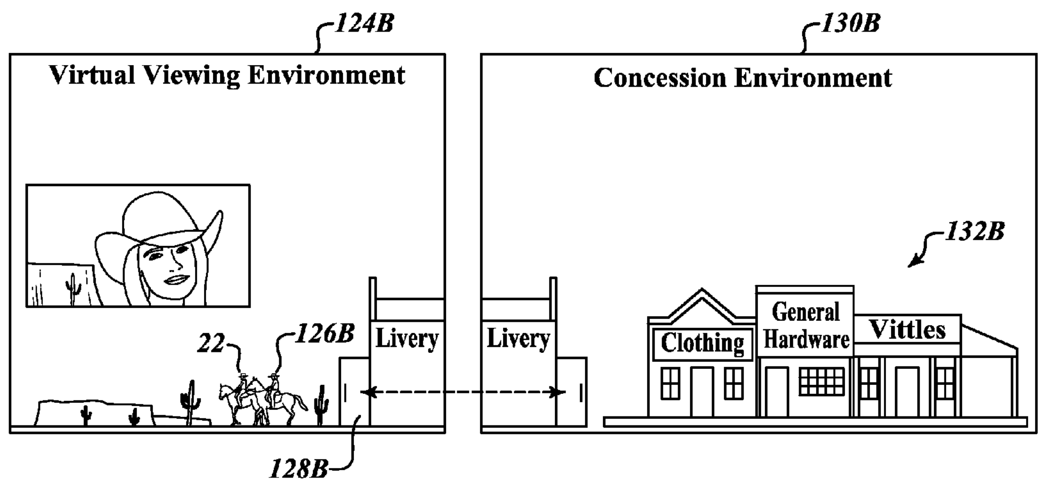

FIGS. 12A and 12B are views illustrating two examples of virtual viewing environments and concession environments within the virtual entertainment world 24 according to principles disclosed herein.

Virtual viewing environments 124A and 124B provide viewing locations for the user 22 to watch selected virtual events. As discussed with respect to FIG. 5, the viewing locations for the virtual viewing environments 124A and 124B may be user selectable or pre-selected. In this example, the virtual viewing environments 124A and 124B includes celebrity models 126A and 126B, and access points 128A and 128B, respectively.

The celebrity models 126A and 126B are configured to interact with the user 22. For example, the celebrity models 126A and 126B may watch selected virtual events with the user 22, provide additional description information about the selected virtual events, answer any questions about the selected virtual events, offer the user 22 items available for purchase, and ask the user 22 to follow their future endeavors through social media, such as Facebook and Twitter.

In one embodiment, the celebrity models 126A and 126B are user selectable. For example, the user 22 may choose to interact with their favorite celebrity, whether their favorite celebrity is related to a selected virtual event or not. In another embodiment, the celebrity models 126A and 126B are pre-selected based on selected virtual events. For example, in FIG. 12A, the user has selected to watch the Oscar-winning movie Gravity, and the celebrity model 126A has been pre-selected to be Sandra Bullock.

The access points 128A and 128B provides point of entries from the virtual viewing environments 124A and 124B to the concession environments 130A and 130B, respectively, and vice versa. For example, as shown in FIG. 12A, the user 22 may be in the viewing environment 124A and directly enter the concession environment 130A to make purchases. The user 22 may then return to the viewing environment 124A after making a purchase.

It should be noted that, although FIGS. 12A and 12B depict the user 22 within the virtual viewing environments 124A and 124B, in one embodiment, the user 22 has a first person point of view.

The concession environments 130A and 130B provide environments where the user 22 may make purchases of real items, not virtual items. The locations for the concession environments 130A and 130B may be user selectable or may be pre-selected to match the virtual viewing environments 124A and 124B, respectively. In this example, the concession environments 130A and 130B includes the access points 128A and 128B, respectively, and concessions 132A and 132B, respectively.

As previously discussed, the access points 128A and 128B provides point of entries from the concession environments 130A and 130B to the virtual viewing environments 124A and 124B, respectively, and vice versa.

The concessions 132A and 132B may include memorabilia concessions, apparel concessions, and food concessions. A memorabilia concession may include swords, figurines, and jewelry available for purchase. An apparel concession may include shirts, hats, and jackets available for purchase. A food concession may include pizza, hamburgers, popcorn, and candy available for purchase. In one embodiment, the memorabilia, apparel, and food available for purchase are related to selected virtual events. For example, if the user 22 has selected to watch the movie The Hobbit, the memorabilia concession may include a replica of the sword used in the movie.

In the embodiment shown in FIG. 12A, the user 22 has selected to watch the Oscar-winning movie Gravity in the Sundance Film Festival Theatre within the virtual viewing environment 124A. The user 22 is joined by a celebrity model of Gravity's star, Sandra Bullock 126A, wearing wardrobe that she wore in the movie. Within the Sundance Film Festival Theatre, the user 22 may enter the concession environment 130A to make purchases. The location for the concession environment 130A is the lobby area of the Sundance Film Festival Theatre.

In the embodiment shown in FIG. 12B, the user 22 has selected to watch the movie True Grit in the desert within the virtual viewing environment 124B. The user 22 is joined by True Grit's star, John "The Duke" Wayne 126B, wearing wardrobe that he wore in the movie. Both the user 22 and John "The Duke" Wayne 126B are sitting on horses. While in the desert, the user 22 may enter the concession environment 130B to make purchases. The location for the concession environment 130B is a western themed town.

F. Example Concession Process for a Virtual Entertainment Environment System

Figure 13:
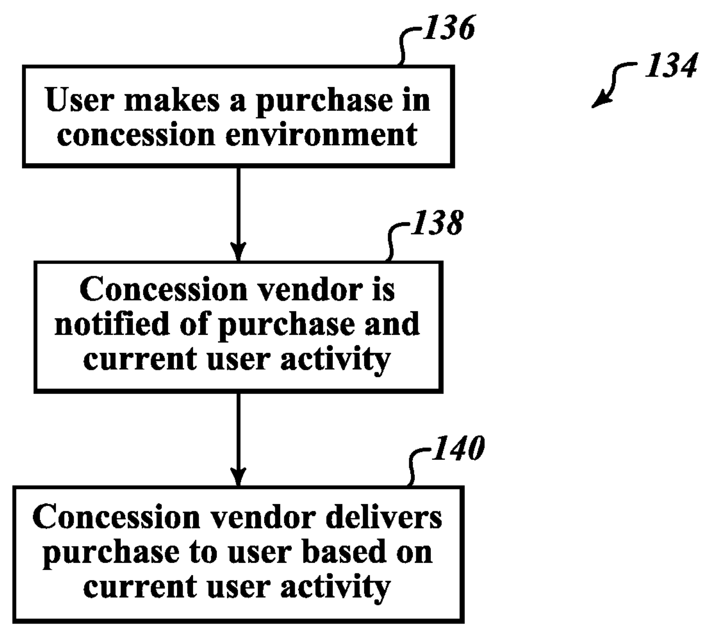
FIG. 13 is a flow diagram illustrating an example of a concession process for a virtual entertainment environment according to one embodiment as disclosed herein.

FIG. 13 is a flow diagram illustrating an example of a concession process 134 for the virtual entertainment environment 20 according to principles disclosed herein.

At a first part of the sequence 136, the user 22 makes a purchase that is to be delivered to the user 22 in a concession environment.

In step 138, the concession vendor for the purchase is notified of the user's 22 purchase and the user's 22 current activity. For example, the concession vendor may be notified of the item that was purchased, the user's 22 payment information (e.g., credit card information), the expected delivery date and time of the purchase, a virtual event that the user 22 has selected to watch, a start and end time of a virtual event that the user 22 has selected to watch, timing of critical scenes for a virtual event that the user 22 has selected to watch, and how long the user 22 has been watching a virtual event. The concession vendor may be notified of the user's 22 purchase and the user's 22 current activity through the receiver, the internet, or any other type of communication media, now known or later developed.

In step 140, the concession vendor delivers the purchase to the user 22 based on the user's 22 current activity. For example, the concession vendor may deliver the purchase to avoid a critical scene of a movie, at the end time of a movie, or during a commercial break of a TV show.

In another embodiment, the concession vendor may send notifications to the user 22 within the virtual entertainment world 24. For example, the concession vendor may interrupt a virtual event that the user 22 is currently watching to notify the user 22 when the purchase will arrive, when the purchase has arrived, or of any problems that has occurred related to the purchase.

In an illustrating example of the concession process 134, in step 136, the user 22 has selected to watch the Oscar-winning movie Gravity in a virtual viewing environment. The user 22 then enters a concession environment and purchases a pizza to be delivered from Pizza Hut. In step 138, Pizza Hut is notified of the purchase and the user's 22 current activity. Particularly, Pizza Hut is notified that the user 22 has been watching Gravity for an hour, a critical scene in Gravity occurs in 20 minutes, and Gravity ends in 45 minutes. In step 140, Pizza Hut delivers the pizza to the user 22 in a time sequence based on the movie being watched. For example, Pizza Hut is provided the information that the person who ordered the pizza is watching a movie that ends in 45 minutes. Therefore, Pizza Hut can time the delivery of the pizza to be at least 45 minutes later, but no more than 50 minutes later.

Alternatively, Pizza Hut, if requested by the user, can deliver the pizza before Gravity ends, but after 20 minutes, so the user is not disturbed during the critical scene. For example, the concession application, right after the order is placed for a food item can have a query; "Do you want this delivered just after your movie ends?" The user can answer "yes" and the system knows the time left in the movie and can notify the delivery company of the preferred delivery time. Or, if the user states, "No, please deliver as soon as the food is ready," the provider can be notified to bring the pizza or other food as soon as practical, even to interrupt the move. This delivery schedule and, in some embodiments query, can be done for any food item, not just pizza and, if appropriate, for any non-food items as well.

While various embodiments have been described hereinabove, it is to be appreciated that various changes in form and detail may be made without departing from the spirit and scope of the invention(s) presently or hereafter claimed.

The invention claimed is:

1. A system comprising:

a virtual world storage configured to store virtual world data including concierge model data, concierge location data, and viewing location data;

a media storage configured to store media data including celebrity model data;

a concession storage configured to store concession data including food data, apparel data, and memorabilia data;

a server coupled to the virtual world storage, the media storage, and the concession storage, the server configured to assemble virtual environment data including the virtual world data, the media data, and the concession data; and a receiver coupled to the server, the receiver configured to obtain the virtual environment data from the server and virtual event data from a distributor, the virtual event data including audio data, video data, description data, and celebrity wardrobe data, the receiver further configured to combine the virtual environment data with the virtual event data to create a virtual world having a virtual program guide, a virtual viewing environment, and a virtual concession environment, the virtual program guide displaying, within a first virtual location, a menu of virtual events including a selection of viewing content, the virtual viewing environment displaying, within a second virtual location, an access point and selected viewing content from the selection of viewing content in response to the selected viewing content being selected from the menu, the access point providing a passage from the virtual viewing environment to the virtual concession environment, the virtual concession environment displaying, within a third virtual location, a plurality of items available for purchase in response to accessing the access point from the virtual viewing environment, the first virtual location simulating a first physical location, the second virtual location simulating a second physical location that is different from the first physical location, the third virtual location simulating a third physical location that is different from the first physical location and the second physical location.

2. The system according to claim 1, wherein the receiver is further configured to customize the virtual world by analyzing virtual events that the user has selected in a prior time period, loading virtual event data based on the analysis, and combining the virtual event data that was loaded based on the analysis with the virtual environment data.

3. The system according to claim 1, wherein the virtual program guide includes a concierge model at a concierge location, the concierge model configured to introduce the menu of virtual events to the user.

4. The system according to claim 3, wherein the virtual viewing environment includes a celebrity model that is customized to the selected viewing content, the celebrity model donning wardrobe that is derived the selected viewing content.

5. The system according to claim 4, wherein the virtual concession environment includes a food concession, an apparel concession, a memorabilia concession.

6. The system according to claim 1, wherein the virtual world data, the media data, the concession data, and the virtual event data are updated periodically.

7. A method comprising:

displaying, to a user, a virtual program guide in a virtual world, the virtual program guide displaying a menu of virtual events and a concierge model at a concierge location, the concierge location simulating a first physical location;

communicating, to the user, an introduction of the menu of virtual events by the concierge model at the concierge location;

receiving, from the user, a consideration selection of a virtual event from the menu of virtual events;

displaying, to the user, a celebrity model simultaneously with the concierge model at the concierge location after the receiving of the consideration selection, the celebrity model having an identity that matches a celebrity shown in the virtual event;

communicating, to the user, description information of the virtual event by the celebrity model at the concierge location;

receiving, from the user, a viewing selection of the virtual event;

displaying, to the user, the virtual event and the celebrity model within a virtual viewing environment in the virtual world after the receiving of the viewing selection, the virtual viewing environment simulating a second physical location that is different from the first physical location.

8. The method according to claim 7, further including:

communicating, to the user, an introduction of the virtual event by the celebrity model within the virtual viewing environment; and communicating, to the user, answers to questions asked by the user by the celebrity model within the virtual viewing environment.

9. The method according to claim 7, further including:

displaying, to the user, a concession environment access point in the virtual viewing environment;

receiving, from the user, a concession environment access point selection; and displaying, to the user, a food concession, an apparel concession, and a memorabilia concession in a virtual concession environment in the virtual world.

10. The method according to claim 9, further including:

receiving, from the user, a purchase selection in the virtual concession environment;

notifying a concession vendor of the purchase selection and the user's current activity; and delivering, by the concession vendor, the purchase selection to the user based on the user's current activity.

11. The method according to claim 10, further including:

notifying, by the concession vendor, a status of the purchase selection to the user within the virtual world.

12. The method according to claim 7, wherein the celebrity model includes a wardrobe that is related to the virtual event.

13. A method comprising:

assembling, by a server, virtual environment data including virtual world data, media data, and concession data, the virtual world data including concierge model data, concierge location data, and viewing location data, the media data including celebrity model data, the concession data including food data, apparel data, and memorabilia data;

obtaining, by a receiver, the virtual environment data from the server and virtual event data from a distributor, the virtual event data including audio data, video data, description data, and celebrity wardrobe data;

creating, by the receiver, a virtual program guide in a virtual world by combining the virtual environment data with the virtual event data, the virtual program guide including a menu of virtual events and a concierge model at a concierge location, the concierge location simulating a first physical location;

displaying, by a virtual headset, the virtual program guide to a user;

receiving, by the receiver, a viewing selection of a virtual event from the menu of virtual events from the user;

loading, by the receiver, virtual event data of the viewing selection;

creating, by the receiver, a virtual viewing environment in the virtual world by combining the virtual environment data with the loaded virtual event data, the virtual viewing environment simulating a second physical location that is different from the first physical location;

creating, by the receiver, a virtual concession environment in the virtual world using the virtual environment data, the virtual concession environment simulating a third physical location that is different from the first physical location and the second physical location;

displaying, by the virtual headset, the viewing selection within the virtual viewing environment to the user; and displaying, by the virtual headset, a celebrity model and an access point within the virtual viewing environment to the user, the celebrity model having an identity that matches a celebrity shown in the viewing selection and having attributes that are derived from the viewing selection, the access point providing a passage from the virtual viewing environment to the virtual concession environment.

14. The method according to claim 13, further including:

receiving, by the device, an access point selection from the user;

displaying, by the virtual headset, the virtual concession environment to the user, the concession environment including a food concession, an apparel concession, and a memorabilia concession.

15. The method according to claim 13, wherein the creating of the virtual program guide further includes:

analyzing, by the receiver, virtual events that the user has selected in a prior time period;

loading, by the receiver, virtual event data based on the analysis; and customizing, by the receiver, the virtual program guide by combining the virtual environment data with the virtual event data that was loaded based on the analysis.

16. The method according to claim 13, further including:

updating the virtual world data, the media data, the concession data, and the virtual event data periodically.

17. The system according to claim 1, wherein the second virtual location is customized to the selected viewing content and has attributes derived from the selected viewing content.

18. The method according to claim 7, wherein the virtual viewing environment is customized to the virtual event and has attributes derived from the virtual event.

19. The method according to claim 13, wherein the celebrity model is donning wardrobe that is derived from the viewing selection.

20. The system according to claim 1, wherein the second physical location and the third physical location having matching motifs.

* * * * *